United States Patent
Motoyanagi et al.

(10) Patent No.: US 11,648,714 B2
(45) Date of Patent: *May 16, 2023

(54) THERMALLY EXPANDABLE SHEET AND METHOD OF MANUFACTURING THERMALLY EXPANDABLE SHEET

(71) Applicant: CASIO COMPUTER CO., LTD., Tokyo (JP)

(72) Inventors: Yoshimune Motoyanagi, Hamura (JP); Yuji Horiuchi, Higashiyamato (JP); Hideki Takahashi, Ome (JP); Satoshi Mitsui, Nerima-ku Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1122 days.

This patent is subject to a terminal disclaimer.

(21) Appl. No.: 16/278,165

(22) Filed: Feb. 17, 2019

(65) Prior Publication Data

US 2019/0283285 A1 Sep. 19, 2019

(30) Foreign Application Priority Data

Mar. 15, 2018 (JP) .............................. JP2018-047950

(51) Int. Cl.
*B41M 5/28* (2006.01)
*B41M 5/50* (2006.01)
*B29C 44/34* (2006.01)
*B29C 44/06* (2006.01)
(Continued)

(52) U.S. Cl.
CPC .......... *B29C 44/3415* (2013.01); *B29C 44/06* (2013.01); *B29C 44/3411* (2013.01);
(Continued)

(58) Field of Classification Search
CPC ........ B41M 3/16; B41M 5/287; B41M 5/288; B41M 5/506; B32B 5/32; B32B 7/02; B32B 7/022; B32B 7/027
See application file for complete search history.

(56) References Cited

U.S. PATENT DOCUMENTS 5,846,622 A * 12/1998 Imaeda ..................... B32B 7/06
428/317.1
10,538,117 B2 * 1/2020 Motoyanagi ............. B41M 3/06
(Continued)

FOREIGN PATENT DOCUMENTS

JP 64028660 A 1/1989
JP H09175099 A 7/1997
(Continued)

OTHER PUBLICATIONS

Machine translation of detailed description of JP2001-277407 acquired Jun. 3, 2022.*

(Continued)

*Primary Examiner* — Gerard Higgins
(74) *Attorney, Agent, or Firm* — Holtz, Holtz & Volek PC

(57) ABSTRACT

A thermally expandable sheet according to the present invention includes a stress buffer layer provided on one surface of a base material and having an elastic property, a thermal expansion layer provided on the stress buffer layer and containing a first thermally expandable material that expands according to heat and a first binder, and a cover layer provided on the thermal expansion layer and having an elastic property.

8 Claims, 8 Drawing Sheets

(51) Int. Cl.
*B41M 7/00* (2006.01)
*B29K 67/00* (2006.01)
*C08J 9/236* (2006.01)
*B41M 3/16* (2006.01)

(52) U.S. Cl.
CPC ............ B41M 5/287 (2013.01); B41M 5/506 (2013.01); *B29K 2067/003* (2013.01); *B41M 3/16* (2013.01); *B41M 7/009* (2013.01); *C08J 9/236* (2013.01); *C08J 2367/02* (2013.01)

(56) References Cited

U.S. PATENT DOCUMENTS

| | | | |
|---|---|---|---|
| 10,543,659 B2 * | 1/2020 | Motoyanagi | B41M 5/508 |
| 10,562,263 B2 * | 2/2020 | Motoyanagi | C08J 9/36 |

FOREIGN PATENT DOCUMENTS

| | | | |
|---|---|---|---|
| JP | 2001150812 A | | 6/2001 |
| JP | 2001277407 A | | 10/2001 |
| JP | 2001287435 A | | 10/2001 |
| JP | 2002067068 A | | 3/2002 |
| JP | 2009281112 A | * | 12/2009 |
| JP | 2017172086 A | | 9/2017 |

OTHER PUBLICATIONS

Japanese Office Action (and English language translation thereof) dated Mar. 17, 2020 issued in Japanese Application No. 2018-047950.

* cited by examiner

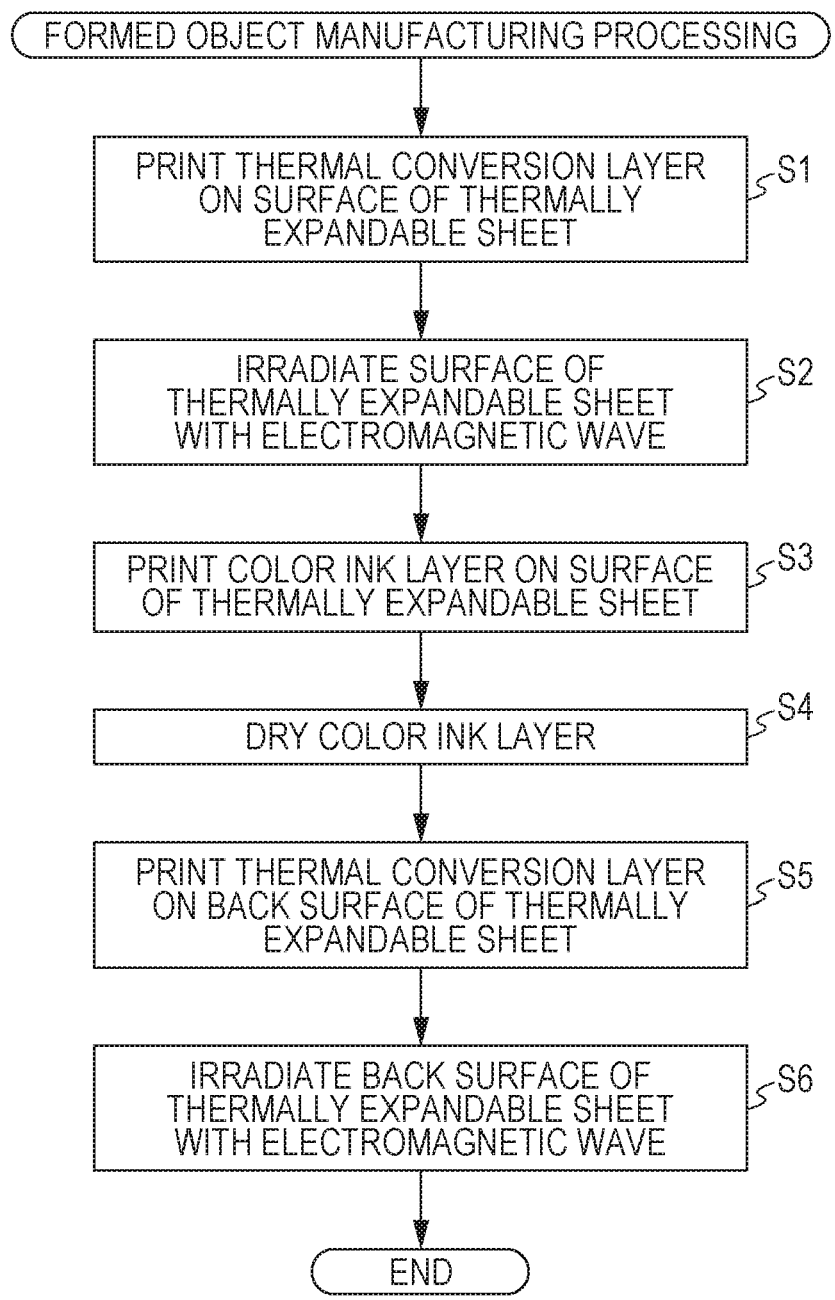

THERMALLY EXPANDABLE SHEET AND METHOD OF MANUFACTURING THERMALLY EXPANDABLE SHEET

BACKGROUND

1. Technical Field

The present invention relates to a thermally expandable sheet that foams and expands according to an amount of absorbed heat, and a method of manufacturing the thermally expandable sheet.

2. Related Art

Conventionally, there has been known a thermally expandable sheet having a thermal expansion layer formed on one surface of a base material sheet, the thermal expansion layer including a thermally expandable material that foams and expands according to the amount of absorbed heat. A photothermal conversion layer for converting light into heat is formed on the thermally expandable sheet and the photothermal conversion layer is irradiated with light so that the thermal expansion layer can be partially or totally expanded. There is also known a method of changing the shape of photothermal conversion layer to form a shaped object having stereoscopic irregularities on a thermally expandable sheet (for example, see JP 64-28660 A and JP 2001-150812 A).

However, if the thermally expandable sheet is bent after the thermal expansion layer expands, cracks may occur in the thermal expansion layer. If the cracks occur in the thermal expansion layer, there are problems that a color image provided on the thermal expansion layer cannot be favorably formed, which affects the appearance of the shaped object. In addition, there is also a problem that the thermal expansion layer easily come off the base material.

Therefore, reduction of the influence by the cracks occurring in the thermal expansion layer is required. In addition, the thermal expansion layer is required to less easily come off the base material.

The present invention has been made in view of the above circumstances, and an object of the present invention is to provide a thermally expandable sheet and a method of manufacturing a thermally expandable sheet capable of reducing an influence of cracks occurring in a thermal expansion layer and improving adhesion between a base material and the thermal expansion layer.

SUMMARY OF THE INVENTION

A thermally expandable sheet includes a stress buffer layer provided on one surface of a base material and having an elastic property, a thermal expansion layer provided on the stress buffer layer and containing a first thermally expandable material that expands according to heat and a first binder, and a cover layer provided on the thermal expansion layer and having an elastic property.

A method of manufacturing a thermally expandable sheet, includes forming a stress buffer layer having an elastic property on one surface of a base material, forming a thermal expansion layer including a first thermally expandable material that expands according to heat and a first binder on the stress buffer layer, and forming a cover layer having an elastic property on the thermal expansion layer.

BRIEF DESCRIPTION OF DRAWINGS

FIG. 4 is a flowchart illustrating a method of manufacturing a shaped object according to an embodiment;

DETAILED DESCRIPTION

Hereinafter, a thermally expandable sheet and a method of manufacturing a thermally expandable sheet according to an embodiment of the present invention will be described in detail with reference to the drawings. In the present embodiment, at least part of a thermal expansion layer is caused to expand to form a shaped object on the thermally expandable sheet.

In the present specification, the "shaped object" includes a wide range of shapes such as a simple shape, a geometric shape, a character, and decoration. Here, the decoration reminds people of a sense of beauty through visual and/or tactile sensation. Further, "shaping (or molding)" is not limited to simply forming a shaped object but also includes concepts such as adding decoration and forming decoration.

Furthermore, a decorative shaped object indicates a shaped object formed as a result of the adding decoration and forming decoration.

The shaped object of the present embodiment has irregularities in a direction (for example, a Z axis) perpendicular to a specific two-dimensional plane (for example, an XY plane) in a three-dimensional space. Such a shaped object is an example of a stereoscopic (3D) image, but to distinguish the shaped object from a stereoscopic image produced by a so-called 3D printer technology, the shaped object is called 2.5-dimensional (2.5D) image or pseudo three-dimensional (pseudo-3D) image. Further, a technology of manufacturing such a shaped object is an example of a three-dimensional image printing technology, but to distinguish the technology from the so-called 3D printer, the technology is called 2.5D printing technology or pseudo three-dimensional (pseudo-3D) printing technology.

(Thermally Expandable Sheet)

Figure 1:
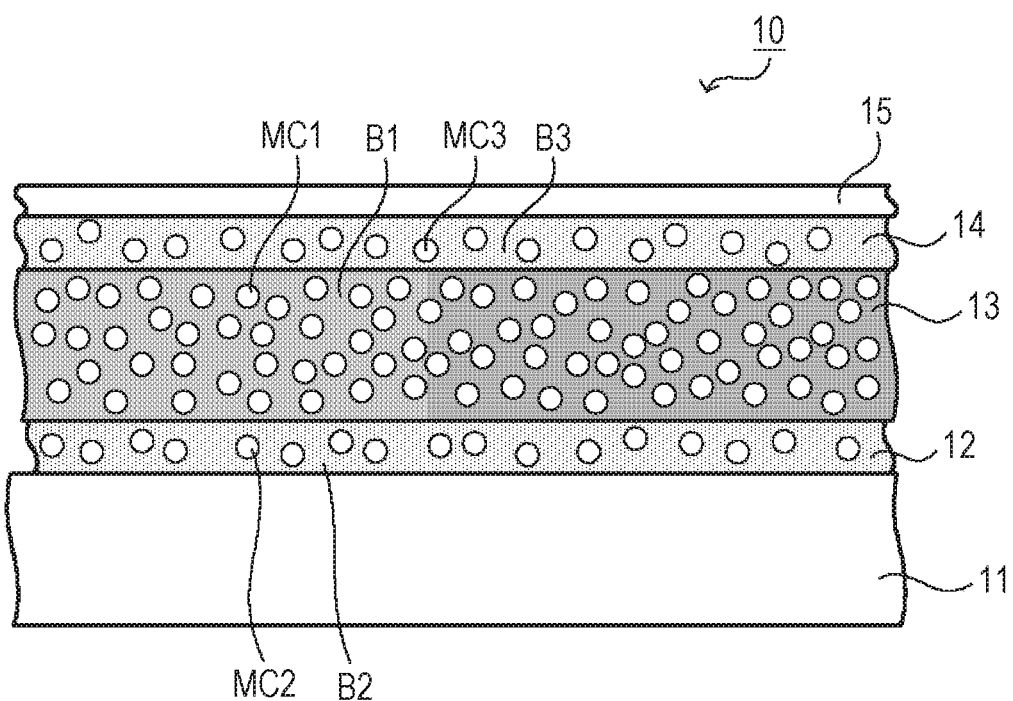
FIG. 1 is a cross-sectional view schematically illustrating a thermally expandable sheet according to an embodiment.

As schematically illustrated in FIG. 1, a thermally expandable sheet 10 according to the present embodiment includes a base material 11, a stress buffer layer 12, a thermal expansion layer 13, a cover layer 14, and an ink receiving layer 15. Further, as will be described below in detail, printing is applied to the thermally expandable sheet 10 in a shaping system 20 schematically illustrated in FIGS. 3A to 3C, and at least part of the thermal expansion layer 13 of the thermally expandable sheet 10 expands. Further, at least part of the thermal expansion layer 13 bulges to form a projection or irregularities on the surface of the thermally expandable sheet 10. The shaped object can be expressed by a combination of the height of the projection or irregularities, the position where the projection or irregularities are formed, and the like. Note that one or a plurality of projections or irregularities is formed on the thermally expandable sheet 10 according to the shaped object.

The base material 11 is a sheet-like member that supports the thermal expansion layer 13 and the like. The stress buffer layer 12 is formed on one surface (a front surface or an upper surface in FIG. 1) of the base material 11. As the base material 11, a paper such as woodfree paper or a sheet (including a film) made of a resin such as polyethylene terephthalate (PET) is used. The paper is not limited to woodfree paper, and any widely used paper can be used. Further, the resin is not limited to PET, and any resin can be used. An example of the resin includes a material selected from polyolefin resins such as polyethylene and polypropylene, a polyester resin, a polyamide resin such as nylon, a polyvinyl chloride resin, a polyimide resin, and a silicone resin. Further, the base material 11 has such a strength as not to bulge on an opposite side (lower side in FIG. 1) of the base material 11 when the thermal expansion layer 13 partially or totally expands due to foaming. Further, the base material 11 has such strength that the form as a sheet is not impaired due to wrinkling or large undulation when the thermal expansion layer 13 expands. In addition, the base material 11 has heat resistance enough to withstand heating when the thermal expansion layer 13 is caused to foam. The base material 11 may further have an elastic property.

The stress buffer layer 12 is provided on the one surface (the upper surface illustrated in FIG. 1) of the base material 11. The stress buffer layer 12 is a layer having an elastic property. The stress buffer layer 12 reduces a difference in stress between the base material 11 and the thermal expansion layer 13 and can suppress occurrence of cracks in the thermal expansion layer 13 when the thermal expansion layer 13 expands. Therefore, the stress buffer layer 12 contains a resin having rubber elasticity, for example, thermoplastic elastomer. The thermoplastic elastomer is selected from, but is not limited to, polyvinyl chloride, ethylene propylene rubber (EPR), ethylene-vinyl acetate copolymer (EVA), styrene thermoplastic elastomer, olefinic thermoplastic elastomer, urethane thermoplastic elastomer, and polyester thermoplastic elastomer. In addition, since the stress buffer layer 12 favorably adheres to the base material 11, the stress buffer layer 12 can prevent the thermal expansion layer 13 from coming off the base material 11.

The stress buffer layer 12 may further include a thermally expandable material (thermally expandable microcapsules or micropowder) contained in the thermal expansion layer 13 to be described below. In this case, as illustrated in FIG. 1, the stress buffer layer 12 contains the thermoplastic elastomer as a binder B2, and a thermally expandable material MC2 is dispersed in the binder B2. Further, as will be described below in detail, a ratio (second ratio) of the contained thermally expandable material MC2 to the binder B2 is set to be lower than a ratio (first ratio) of a contained thermally expandable material MC1 to a binder B1 in the thermal expansion layer 13. Here, the ratio of the contained thermally expandable material to the binder is arbitrary, and is defined, for example, by using a volume ratio, a weight ratio, or the like. Note that the ratio of the contained thermally expandable material to the binder may be defined by the density. Note that it is not indispensable that the stress buffer layer 12 contains the thermally expandable material MC2 and does not need to contain the thermally expandable material MC2.

The thermal expansion layer 13 is provided on the stress buffer layer 12 as illustrated in FIG. 1. The thermal expansion layer 13 is a layer that expands to a size according to the degree of heating (for example, a heating temperature or a heating time), and the thermally expandable material (thermally expandable microcapsules or micropowder) MC1 is arranged in the binder B2 in a dispersed manner. Further, as will be described below in detail, in the present embodiment, an electromagnetic wave thermal conversion layer (hereinafter simply referred to as a thermal conversion layer or a conversion layer) for converting an electromagnetic wave into heat is formed on the upper surface (front surface) of the thermally expandable sheet 10 and/or on a lower surface (back surface) of the thermally expandable sheet 10, and the thermal conversion layer is irradiated with an electromagnetic wave to generate heat. Since the electromagnetic wave thermal conversion layer has heat by irradiation with an electromagnetic wave, the electromagnetic wave thermal conversion layer can also be called heat zone layer. The heat generated in the thermal conversion layer provided on the front surface and/or back surface of the thermally expandable sheet 10 is transmitted to the thermal expansion layer 13, so that the thermally expandable material in the thermal expansion layer 13 foams and expands. The thermal conversion layer quickly converts the electromagnetic wave into heat, as compared with other regions where no thermal conversion layer is provided. Therefore, only a region near the thermal conversion layer can be selectively heated, and only a specific region of the thermal expansion layer 13 can be selectively caused to expand. The thermal expansion layer 13 is not limited to a single layer, and may have a plurality of layers.

As the binder of the thermal expansion layer 13, an arbitrary thermoplastic resin such as vinyl acetate polymer or acrylic polymer is used. As the binder, the thermoplastic elastomer may be used. The thermoplastic elastomer is selected from, but is not limited to, polyvinyl chloride, ethylene propylene rubber (EPR), ethylene-vinyl acetate copolymer (EVA), styrene thermoplastic elastomer, olefinic thermoplastic elastomer, urethane thermoplastic elastomer, and polyester thermoplastic elastomer. Further, the thermally expandable microcapsules contain propane, butane, and other low-boiling point vaporizable substances in a shell of the thermoplastic resin. The shell is formed of a thermoplastic resin of polystyrene, polyvinyl chloride, polyvinylidene chloride, polyvinyl acetate, polyacrylic acid ester, polyacrylonitrile, polybutadiene, or a copolymer thereof. For example, an average particle size of the thermally expandable microcapsules is about 5 to 50 μm. When the microcapsules are heated to equal to or higher than thermal expansion starting temperature, the shell made of the resin softens and the low-boiling point vaporizable substances contained in the shell vaporize, and the shell expands in a balloon manner by the pressure. The particle size of the microcapsules expands to about five times the particle size before expansion although depending on characteristics of the microcapsules to be used. Note that there are variations in the particle size of the microcapsules, and not all the microcapsules have the same particle size.

Further, in the present embodiment, the ratio (also referred to as content) of the contained thermally expandable material MC2 to the binder B2 in the stress buffer layer 12 is set to be smaller than the ratio (also referred to as content) of the contained thermally expandable material MC1 to the binder B1 in the thermal expansion layer 13. Here, the ratio of the contained thermally expandable material to the binder is arbitrary, and is defined, for example, by using a volume ratio, a weight ratio, or the like. Taking the weight ratio as an example, a weight ratio (second ratio) of the thermally expandable material MC2 to the binder B2 is smaller than a weight ratio (first ratio) of the thermally expandable material MC1 to the binder B1, and is specifically about 1/3 to 1/8. In other words, in a case where the thermally expandable material MC2 dispersed in 100 parts by weight of the binder B2 is X2 parts by weight and the thermally expandable material MC1 dispersed in 100 parts by weight of the binder B1 is X1 parts by weight, X2/X1 is smaller than 1 and is about 1/3 to 1/8. Note that the ratio of the contained thermally expandable material to the binder may be defined by the density. In this case, the stress buffer layer 12 can be said to contain the thermally expandable material at lower density than the thermal expansion layer 13.

Further, since the stress buffer layer 12 contains the thermally expandable material MC2 at a lower ratio than the thermal expansion layer 13, the thermally expandable material MC2 in the stress buffer layer 12 may not foam and expand.

In addition, forming the binder B2 of the stress buffer layer 12 with the same material as the binder B1 of the thermal expansion layer 13 is favorable because the material can be shared. Similarly, forming the thermally expandable material MC2 of the stress buffer layer 12 with the same material as the thermally expandable material MC1 of the thermal expansion layer 13 is favorable. Both the binders and the thermally expandable materials may be formed with the same material, or only one of the binders and the thermally expandable materials may be formed with the same material between the stress buffer layer 12 and the thermal expansion layer 13.

The cover layer 14 is provided on the thermal expansion layer 13 as illustrated in FIG. 1. The cover layer 14 is a layer having an elastic property and at least part of the cover layer 14 extends as the thermal expansion layer 13 expands. The cover layer 14 includes a resin having rubber elasticity, for example, thermoplastic elastomer. The thermoplastic elastomer is selected from, but is not limited to, polyvinyl chloride, ethylene propylene rubber (EPR), ethylene-vinyl acetate copolymer (EVA), styrene thermoplastic elastomer, olefinic thermoplastic elastomer, urethane thermoplastic elastomer, and polyester thermoplastic elastomer. The cover layer 14 formed with such a material hardly cracks even when the thermally expandable sheet 10 is largely bent (for example, 90° or more). The expansion of the cover layer 14 suppresses occurrence of cracks in the thermal expansion layer 13. Further, even when cracks occur in the thermal expansion layer 13, cracks hardly occur in the cover layer 14. Therefore, the cracks generated in the thermal expansion layer 13 can be concealed by the cover layer 14.

The cover layer 14 may further contain a thermally expandable material such as the material contained in the thermal expansion layer 13. In this case, as illustrated in FIG. 1, the cover layer 14 contains the thermoplastic elastomer as a binder B3, and a thermally expandable material MC3 is dispersed in the binder B3.

Further, a ratio (third ratio) of the contained thermally expandable material MC3 to the binder B3 is set to be lower than the ratio of the contained thermally expandable material MC1 to the binder B1 in the thermal expansion layer 13. Here, the ratio of the contained thermally expandable material to the binder is arbitrary. Specifically, the ratio is about 1/3 to 1/8. In other words, in a case where the thermally expandable material MC3 dispersed in 100 parts by weight of the binder B3 is X3 parts by weight and the thermally expandable material MC1 dispersed in 100 parts by weight of the binder B1 is X1 parts by weight, X3/X1 is smaller than 1 and is about 1/3 to 1/8. Note that the ratio of the contained thermally expandable material to the binder may be defined by the density, and the cover layer 14 can be said to contain the thermally expandable material at lower density than the thermal expansion layer 13. Further, X2 in the stress buffer layer 12 and the X3 in the cover layer 14 may be the same value or may be different values. Note that it is not indispensable that the cover layer 14 contains the thermally expandable material MC3 and does not need to contain the thermally expandable material MC3.

In addition, forming the binder B3 of the cover layer 14 with the same material as the binder B1 of the thermal expansion layer 13 is favorable because the material can be shared. Similarly, forming the thermally expandable material MC3 of the cover layer 14 with the same material as the thermally expandable material MC1 of the thermal expansion layer 13 is favorable. Both the binders and the thermally expandable materials may be formed with the same material, or only one of the binders and the thermally expandable materials may be formed with the same material between the cover layer 14 and the thermal expansion layer 13.

Further, since the cover layer 14 contains the thermally expandable material MC3 at a lower ratio than the thermal expansion layer 13, the thermally expandable material MC3 in the cover layer 14 may not foam and expand.

The ink receiving layer 15 is provided on the cover layer 14. The ink receiving layer 15 is a layer that receives and fixes an ink used in a printing process, for example, an ink of an inkjet printer. The ink receiving layer 15 is formed using a known material according to the ink used in the printing process. For example, in a type that receives an ink using voids in a case of using an aqueous ink, the ink receiving layer 15 is formed using, for example, porous silica. In a type that swells and receives an ink, the ink receiving layer 15 is formed using a resin selected from, for example, a polyvinyl alcohol (PVA) resin, a polyester resin, a polyurethane resin, and an acrylic resin. Note that the ink receiving layer 15 can be omitted according to a printing apparatus used in the printing process, the ink to be used, or the like. For example, in a case of using an inkjet type printing apparatus and using a ultraviolet curable ink, the ink receiving layer 15 can be omitted.

(Method of Manufacturing Thermally Expandable Sheet)

Next, a method of manufacturing the thermally expandable sheet 10 will be described with reference to FIGS. 2A to 2D.

Figure 2A:
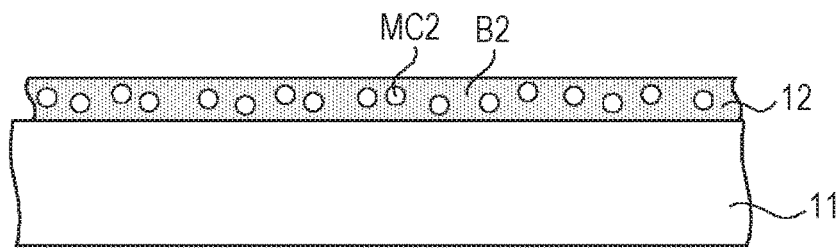
FIGS. 2A to 2D are cross-sectional views illustrating a method of manufacturing a thermally expandable sheet according to an embodiment.

First, the base material 11 is prepared (FIG. 2A). As the base material 11, a roll paper is used, for example. Further, the manufacturing method described below is not limited to the roll type and may be performed by a single wafer type.

Next, the binder and the thermally expandable material (thermally expandable microcapsules) are mixed and a coating liquid for forming the stress buffer layer 12 is prepared using a known dispersing device or the like. Next, the coating liquid is applied to one surface of the base material 11, using a known coating device such as a bar coater, a roller coater, or a spray coater. Next, a coated film is dried to form the stress buffer layer 12 as illustrated in FIG. 2A. To obtain a target thickness of the stress buffer layer 12, application and drying of the coating liquid may be performed a plurality of times. Note that the stress buffer layer 12 does not need to contain the thermally expandable material. In this case, when preparing the coating liquid, no thermally expandable material is added.

Figure 2B:
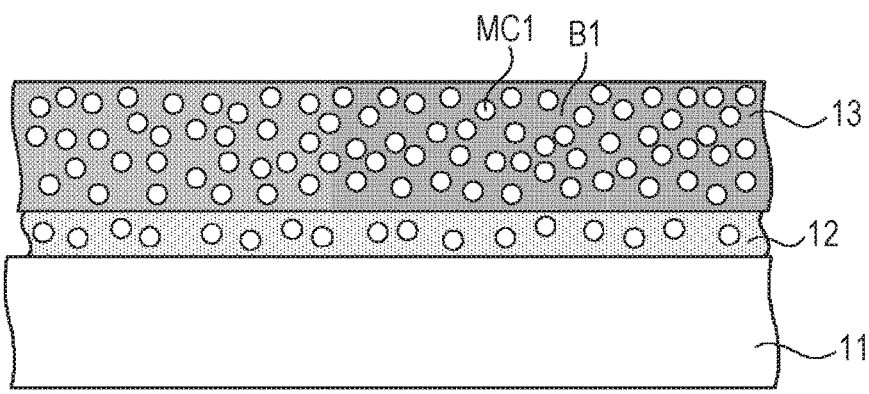

Next, a coating liquid for forming the thermal expansion layer 13 is prepared using the binder made of the thermoplastic resin or the like and the thermally expandable material, using a known dispersing device or the like. Next, the coating liquid is applied to stress buffer layer 12, using a known coating device such as a bar coater, a roller coater, or a spray coater. Next, the coated film is dried to form the thermal expansion layer 13 as illustrated in FIG. 2B. To obtain a target thickness of the thermal expansion layer 13, application and drying of the coating liquid may be performed a plurality of times.

Here, in the case where the thermally expandable material is contained in the stress buffer layer 12, the content of the thermally expandable material to the binder in the stress buffer layer 12 is set to be lower than the content of the thermally expandable material to the binder in the thermal expansion layer 13, and is about 1/3 to 1/8 in the weight ratio, for example. Further, the stress buffer layer 12 and the thermal expansion layer 13 are favorably formed using the same material in at least one of the binders and the thermally expandable materials.

Figure 2C:
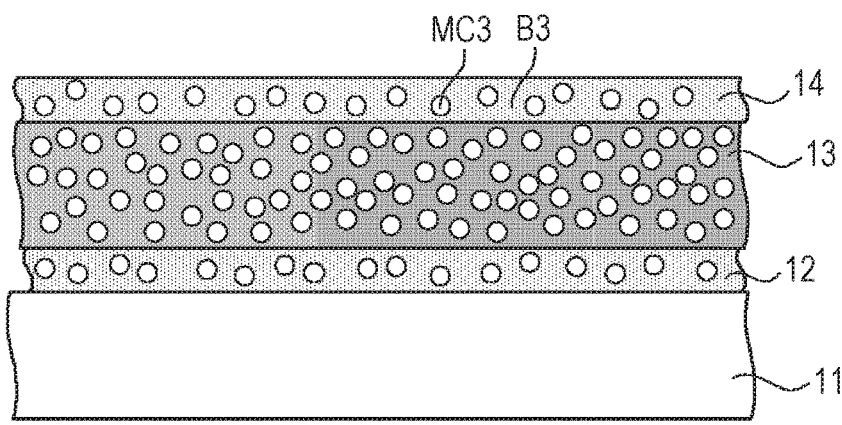

Next, a coating liquid for forming the cover layer 14 is prepared using the binder made of the thermoplastic resin or the like and the thermally expandable material, using a known dispersing device or the like. Next, the coating liquid is applied to thermal expansion layer 13, using a known coating device such as a bar coater, a roller coater, or a spray coater. Next, a coated film is dried to form the cover layer 14 as illustrated in FIG. 2C. To obtain a target thickness of the cover layer 14, application and drying of the coating liquid may be performed a plurality of times.

Here, in the case where the thermally expandable material is contained in the cover layer 14, the content of the thermally expandable material to the binder in the cover layer 14 is set to be lower than the content of the thermally expandable material to the binder in the thermal expansion layer 13, and is about 1/3 to 1/8 in the weight ratio, for example. Further, the cover layer 14 and the thermal expansion layer 13 are favorably formed using the same material in at least one of the binders and the thermally expandable materials.

Figure 2D:
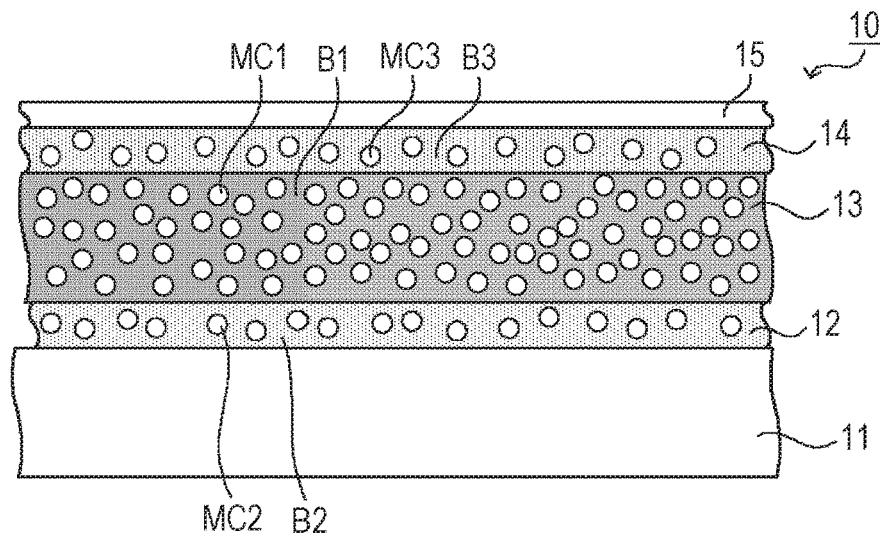

Next, a coating liquid is prepared using a material that constitutes the ink receiving layer 15, for example, porous silica. Next, the coating liquid is applied to cover layer 14, using a known coating device by a method of a bar coater, a roller coater, or a spray coater. To obtain a target thickness of the ink receiving layer 15, application and drying of the coating liquid may be performed a plurality of times. Next, a coated film is dried to form the ink receiving layer 15 as illustrated in FIG. 2D.

Next, in the case of using the roll-shaped base material 11, the base material 11 is cut into a size suitable for the shaping system 20.

The thermally expandable sheet 10 is manufactured by the above processes.

(Shaping System)

Figure 3A:
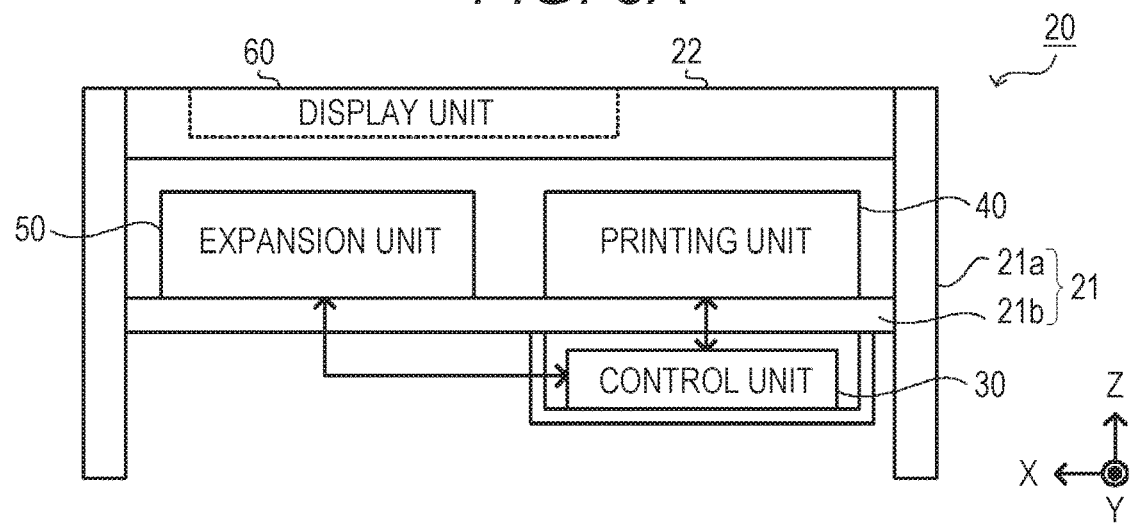
FIGS. 3A to 3C are diagrams illustrating a configuration example of a shaping system according to an embodiment.
Figure 3B:
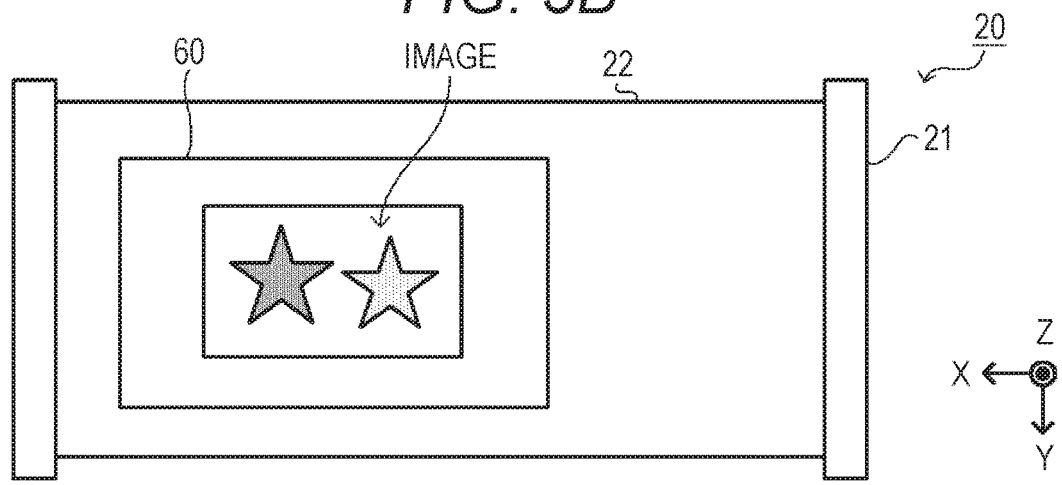
Figure 3C:
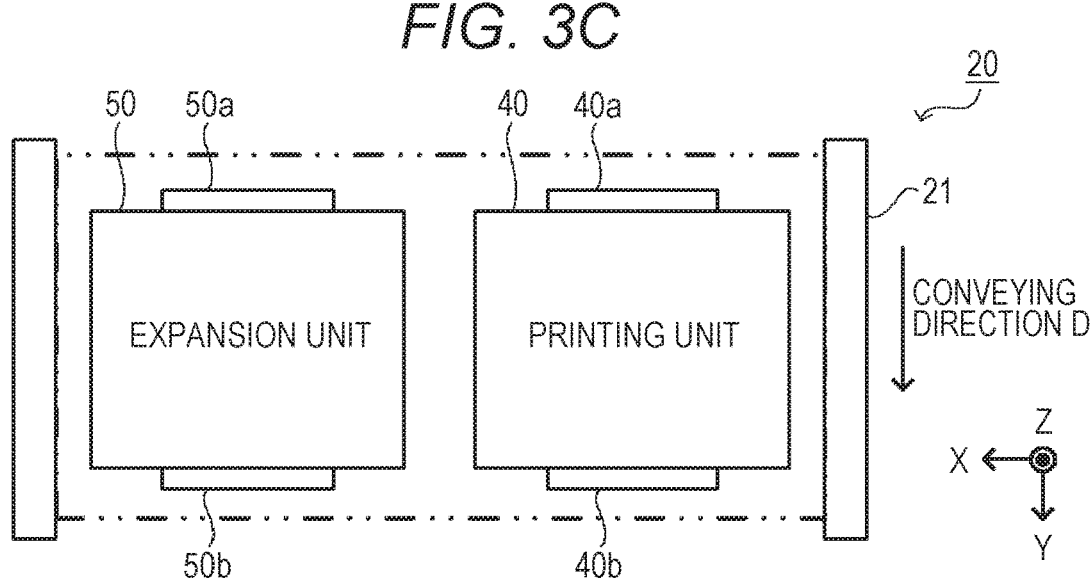

Next, the shaping system 20 for manufacturing the shaped object on the thermally expandable sheet 10 will be described with reference to FIGS. 3A to 3C. FIG. 3A is a front view of the shaping system 20. FIG. 3B is a plan view of the shaping system 20 in a state where a top plate 22 is closed. FIG. 3C is a plan view of the shaping system 20 in a state where the top plate 22 is opened. In FIGS. 3A to 3C, an X direction corresponds to a direction in which a printing unit 40 and an expansion unit 50 are arranged, a Y direction corresponds to a direction of a conveying direction of the thermally expandable sheet 10 in the printing unit 40 and the expansion unit 50, and a Z direction corresponds to a vertical direction. The X direction, the Y direction, and the Z direction are orthogonal to one another.

The shaping system 20 includes a control unit 30, the printing unit 40, the expansion unit 50, and a display unit 60. The control unit 30, the printing unit 40, and the expansion unit 50 are placed in a frame 21 as illustrated in FIG. 3A. Specifically, the frame 21 includes a pair of substantially rectangular side plates 21a and a connecting beam 21b provided between the side plates 21a, and the top plate 22 is passed over the side plates 21a. Further, the printing unit 40 and the expansion unit 50 are arranged side by side in the X direction on the connecting beam 21b passed between the side plates 21a, and the control unit 30 is fixed under the connecting beam 21b. The display unit 60 is embedded in the top plate 22 so that the height of the display unit 60 matches the height of a top surface of the top plate 22.

(Controller Unit)

The control unit 30 controls the printing unit 40, the expansion unit 50, and the display unit 60. Further, the control unit 30 supplies power to the printing unit 40, the expansion unit 50, and the display unit 60. The control unit 30 includes a controller including a central processing unit (CPU) and the like, a storage including a flash memory, a hard disk, and the like, a communicator that is an interface for communicating with an external device, and a recording medium driver that reads a program or data recorded on a portable recording medium (none of them are illustrated).

These parts are connected by a bus for transmitting signals. Further, the recording medium driver reads and acquires color image data, surface foaming data, and back surface foaming data to be printed by the printing unit 40 from the portable recording medium. Here, the color image data is data indicating a color image to be printed on the surface of the thermally expandable sheet 10. The surface foaming data is data indicating a portion to foam and expand on the surface of the thermally expandable sheet 10. Further, the back surface foaming data is data indicating a portion to foam and expand on the back surface of the thermally expandable sheet 10.

(Printing Unit)

The printing unit 40 performs printing on the front surface and/or back surface of the thermally expandable sheet 10. In the present embodiment, the printing unit 40 is an inkjet printer that prints an image by a method of making the ink into fine droplets and directly blowing the droplets onto a medium to be printed. In the printing unit 40, an arbitrary ink can be used, and for example, an aqueous ink, a solvent ink, or a ultraviolet curable ink can be used. Note that the printing unit 40 is not limited to an inkjet printer, and any printing device can be used.

Further, the printing unit 40 includes ink cartridges of cyan, magenta, and yellow inks, and expresses a color image by these inks. Further, the ink cartridge is also provided with an ink containing an electromagnetic wave thermal conversion material (thermal conversion material). The electromagnetic wave thermal conversion material (thermal conversion material) is a material capable of converting an electromagnetic wave into heat. An example of the thermal conversion material includes, but is not limited to, carbon black (graphite) that is carbon molecules. The graphite absorbs the electromagnetic wave and thermally vibrates to generate heat by irradiation with the electromagnetic wave. Note that the thermal conversion material is not limited to graphite, and for example, an inorganic material such as an infrared absorption material can also be used. In the present embodiment, the black ink containing carbon black corresponds to a thermal conversion ink. In the present embodiment, the thermal conversion layer is printed using the black ink. To form black or gray color in a color ink layer 82, a black color ink not including carbon black may be further provided as a color ink.

As illustrated in FIG. 3C, the printing unit 40 includes a loading unit 40a for carrying in the thermally expandable sheet 10, and an unloading unit 40b for carrying out the thermally expandable sheet 10. The printing unit 40 prints an image given in instruction on the front surface and/or back surface of the thermally expandable sheet 10 carried in from the loading unit 40a, and carries out the thermally expandable sheet 10 on which the image has been printed from the unloading unit 40b.

The printing unit 40 acquires image data from the control unit 30 and executes printing on the basis of the acquired image data. More specifically, the printing unit 40 acquires the color image data, the surface foaming data, and the back surface foaming data as the image data. The printing unit 40 causes a printing head to eject the cyan, magenta, and yellow inks to the thermally expandable sheet 10 to print a color image. Further, the printing unit 40 causes the printing head to eject the black ink containing carbon black to the thermally expandable sheet 10 to print a grayscale image (grayscale pattern) corresponding to the surface foaming data or the back surface foaming data.

(Expansion Unit)

The expansion unit 50 irradiates the front surface and/or back surface of the thermally expandable sheet 10 with the electromagnetic wave to cause at least part of the thermal expansion layer to expand. The expansion unit 50 includes a lamp heater, a reflecting plate that reflects the electromagnetic wave irradiated from the lamp heater toward the thermally expandable sheet 10, a temperature sensor that measures the temperature of the reflecting plate, a cooling unit that cools the inside of the expansion unit 50, a pair of conveying rollers that holds and conveys the thermally expandable sheet 10 along a conveying guide, a conveying motor for rotating the pair of conveying rollers, and the like (none of them are illustrated).

The lamp heater is equipped with, for example, a halogen lamp, and irradiates the thermally expandable sheet 10 with the electromagnetic wave (light) in a near infrared region (the wavelength of 750 to 1400 nm), a visible light region (the wavelength of 380 to 750 nm), or a mid-infrared region (the wavelength of 1400 to 4000 nm). When the thermally expandable sheet 10 on which the grayscale image by the thermal conversion ink (heat generation ink) containing the thermal conversion material is irradiated with the electromagnetic wave, the electromagnetic wave is more efficiently converted into heat in the portion where the grayscale image is printed than a portion where no grayscale image is printed. Therefore, when the portion where the grayscale image is printed of the thermally expandable sheet 10 is mainly heated and the temperature reaches the temperature to start expansion, the thermally expandable material expands. Note that an irradiation unit is not limited to a halogen lamp, and another configuration can be adopted as long as the configuration can radiate the electromagnetic wave. Also, the wavelength of electromagnetic wave is not limited to the above ranges.

The expansion unit 50 irradiates the front surface and/or back surface of the thermally expandable sheet 10 with the electromagnetic wave to cause at least part of the thermal expansion layer 13 to expand. As illustrated in FIG. 3C, the expansion unit 50 includes a loading unit 50a for carrying in the thermally expandable sheet 10, and an unloading unit 50b for carrying out the thermally expandable sheet 10. The expansion unit 50 irradiates the front surface and/or back surface of the thermally expandable sheet 10 carried in from the loading unit 50a with the electromagnetic wave to cause at least part of the thermal expansion layer 13 to expand, and carries out the thermally expandable sheet 10 with the expanding thermal expansion layer 13 from the unloading unit 50b.

In the expansion unit 50, the thermally expandable sheet 10 is carried into the unit from the loading unit 50a and is irradiated with the electromagnetic wave radiated by the irradiation unit while being conveyed by the pair of conveying rollers. As a result, a portion where a front-side conversion layer 81 or a back-side conversion layer 83 that is a grayscale image is printed, of the thermally expandable sheet 10, has heat. This heat is transferred to the thermal expansion layer 13, and at least part of the thermal expansion layer 13 expands. The thermally expandable sheet 10 that has expanded by being heated is carried out from the unloading unit 50b.

(Display Unit)

The display unit 60 includes a display device such as a liquid crystal display or an organic electro luminescence (EL) display, and a display drive circuit that causes the display device to display an image. As illustrated in FIG. 3B, for example, the display unit 60 displays an image to be printed on the thermally expandable sheet 10 by the printing unit 40 (for example, the stars illustrated in FIG. 3B). Further, the display unit 60 displays information indicating a current state of the printing unit 40 or the expansion unit 50 as necessary.

Although not illustrated, the shaping system 20 may include an operation unit operated by a user. The operation unit includes buttons, switches, dials, and the like, and receives operations on the printing unit 40 or the expansion unit 50. Alternatively, the display unit 60 may include a touch panel or a touch screen on which the display device and the operation device are stacked.

The shaping system 20 according to the present embodiment controls the amount of expansion of the thermally expandable material by control of shading of the grayscale image (the surface foaming data and the back surface foaming data), control of the electromagnetic wave, and the like, to control the height to bulge of the thermal expansion layer 13, thereby to form a desired irregular shape on the surface of the thermally expandable sheet 10.

Here, the control of the electromagnetic wave refers to controlling the amount of energy that the thermally expandable sheet 10 receives per unit area in order to expand to a desired height when irradiating the thermally expandable sheet 10 with the electromagnetic wave to expand in the shaping system 20. Specifically, the amount of energy that the thermally expandable sheet 10 receives per unit area varies depending on parameters of irradiation intensity of the irradiation unit, moving speed, irradiation time, irradiation distance, temperature, humidity, cooling, and the like. The control of the electromagnetic waves is executed by controlling at least one of the parameters.

(Method of Manufacturing Shaped Object)

Next, a flow of processing of manufacturing a shaped object on the thermally expandable sheet 10 by the shaping system 20 will be described with reference to the flowchart illustrated in FIG. 4 and the cross-sectional views of the thermally expandable sheet 10 illustrated in FIGS. 5A to 6B.

Figure 5A:
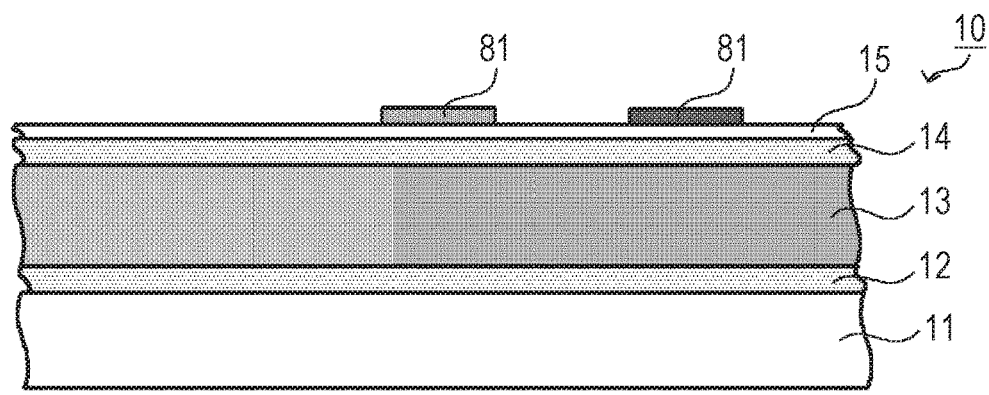
FIGS. 5A to 5C are cross-sectional views schematically illustrating the method of manufacturing a shaped object according to an embodiment.

First, the user prepares the thermally expandable sheet 10 before manufacturing the shaped object and specifies the color image data, the surface foaming data, and the back surface foaming data via the display unit 60. Then, the thermally expandable sheet 10 is inserted into the printing unit 40 with the front surface facing upward. The printing unit 40 prints the thermal conversion layer (front-side conversion layer 81) on the surface of the inserted thermally expandable sheet 10 (step S1). The front-side conversion layer 81 is a layer formed with the ink containing the electromagnetic wave thermal conversion material, for example, the black ink containing carbon black. The printing unit 40 ejects the black ink containing carbon black onto the surface of the thermally expandable sheet 10 according to the specified surface foaming data. As a result, as illustrated in FIG. 5A, the front-side conversion layer 81 is formed on the ink receiving layer 15. For ease of understanding, FIG. 5A illustrates that the front-side conversion layer 81 is formed on the ink receiving layer 15. However, more precisely, the black ink is received in the ink receiving layer 15, and thus the front-side conversion layer 81 is formed in the ink receiving layer 15.

Figure 5B:
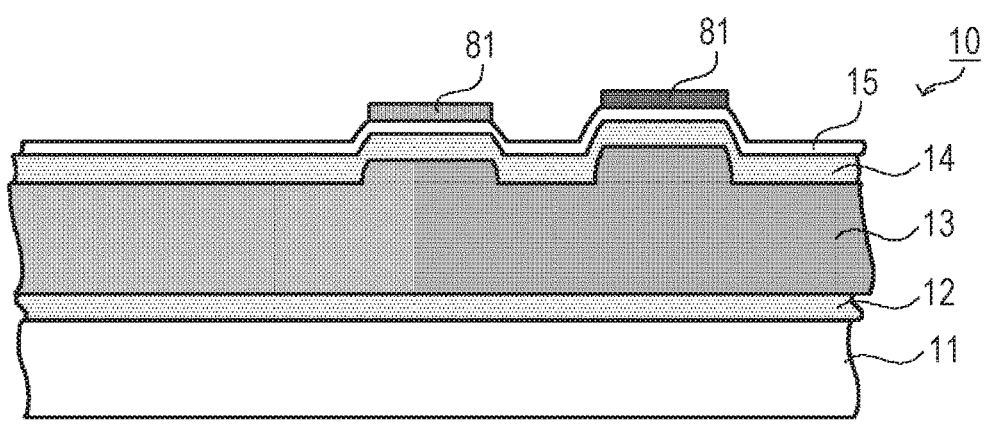

Secondly, the user inserts the thermally expandable sheet 10 with the front-side conversion layer 81 printed thereon into the expansion unit 50 with the surface facing upward. The expansion unit 50 irradiates the inserted thermally expandable sheet 10 with the electromagnetic wave from the surface (step S2). More specifically, the expansion unit 50 irradiates the surface of the thermally expandable sheet 10 with the electromagnetic wave by the irradiation unit. The thermal conversion material contained in the front-side conversion layer 81 printed on the surface of the thermally expandable sheet 10 generates heat by absorbing the irradiated electromagnetic wave. As a result, the front-side conversion layer 81 generates heat, and the region where the front-side conversion layer 81 is printed, of the thermal expansion layer 13 of the thermally expandable sheet 10, expands and swells, as illustrated in FIG. 5B.

Figure 5C:
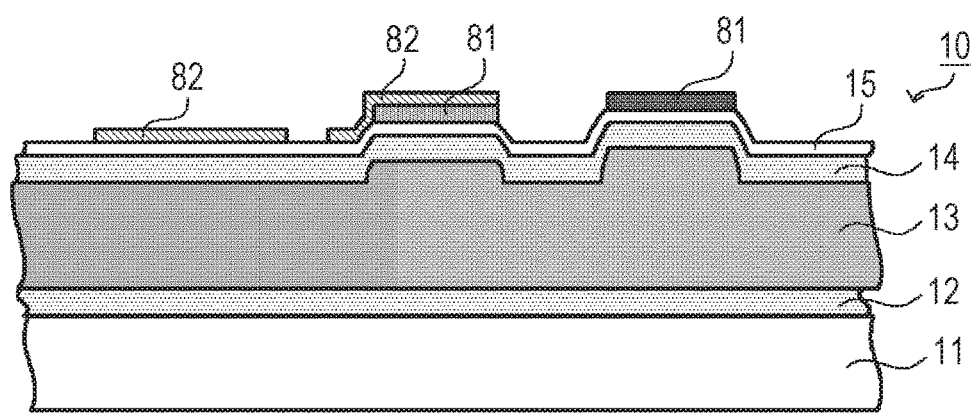

Thirdly, the thermally expandable sheet 10 with expanding part of the thermal expansion layer 13 is inserted into the printing unit 40 with the surface facing upward. The printing unit 40 prints a color image (color ink layer 82) on the surface of the inserted thermally expandable sheet 10 (step S3). More specifically, the printing unit 40 ejects the cyan, magenta, and yellow inks onto the surface of the thermally expandable sheet 10 according to the specified color image data. As a result, the color ink layer 82 is formed on the ink receiving layer 15, as illustrated in FIG. 5C. Note that FIG. 5C illustrates that the color ink layer 82 is formed on the ink receiving layer 15. However, more precisely, the color ink is received in the ink receiving layer 15.

Fourthly, the color ink layer 82 is dried after formed (step S4). For example, the user inserts the thermally expandable sheet 10 with the color ink layer 82 printed thereon into the expansion unit 50 with the back surface facing upward. The expansion unit 50 heats the inserted thermally expandable sheet 10 from the back surface to dry the color ink layer 82 formed on the surface of the thermally expandable sheet 10. More specifically, the expansion unit 50 irradiates the back surface of the thermally expandable sheet 10 with the electromagnetic wave by the irradiation unit to heat the color ink layer 82 to volatilize a solvent contained in the color ink layer 82.

Note that step S4 can be omitted.

Figure 6A:
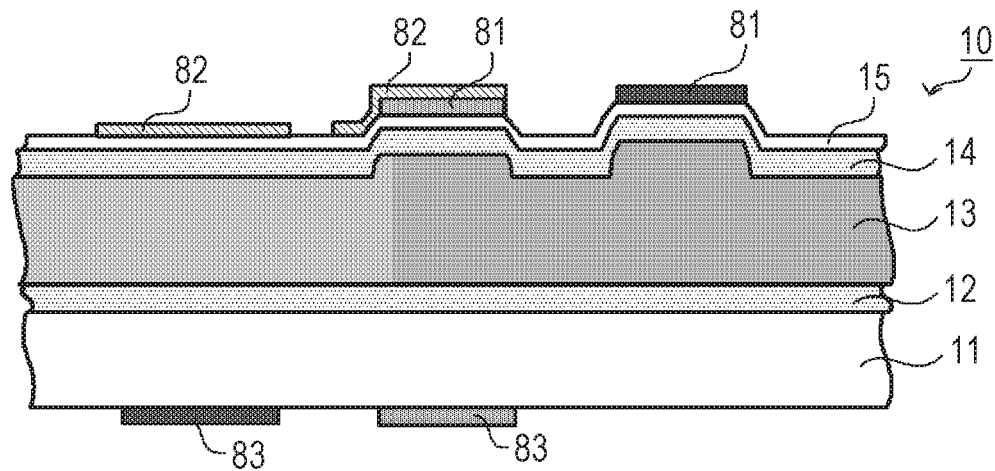
FIGS. 6A and 6B are cross-sectional views schematically illustrating the method of manufacturing a shaped object according to an embodiment.

Fifthly, the user inserts the thermally expandable sheet 10 with the color ink layer 82 printed thereon into the printing unit 40 with the back surface facing upward. The printing unit 40 prints the thermal conversion layer (back-side conversion layer 83) on the back surface of the inserted thermally expandable sheet 10 (step S5). The back-side conversion layer 83 is a layer formed with a material that converts the electromagnetic wave into heat, specifically, the black ink containing carbon black, similarly to the front-side conversion layer 81 printed on the front surface of the thermally expandable sheet 10. The printing unit 40 ejects the black ink containing carbon black onto the back surface of the thermally expandable sheet 10 according to the specified back surface foaming data. As a result, the back-side conversion layer 83 is formed on the back surface of the base material 11, as illustrated in FIG. 6A.

Figure 6B:
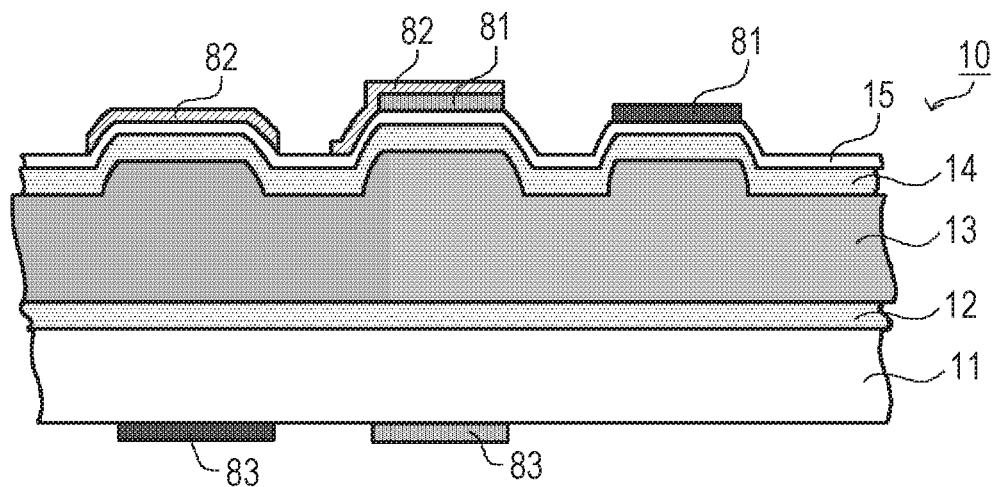

Sixthly, the user inserts the thermally expandable sheet 10 with the back-side conversion layer 83 printed thereon into the expansion unit 50 with the back surface facing upward. The expansion unit 50 irradiates the inserted thermally expandable sheet 10 with the electromagnetic wave from the back surface and heats the thermally expandable sheet 10 (step S6). More specifically, the expansion unit 50 irradiates the back surface of the thermally expandable sheet 10 with the electromagnetic wave by the irradiation unit (not illustrated). The back-side conversion layer 83 printed on the back surface of the thermally expandable sheet 10 generates heat by absorbing the irradiated electromagnetic wave. As a result, a region where the back-side conversion layer 83 is printed, of the thermal expansion layer 13 of the thermally expandable sheet 10, expands and swells, as illustrated in FIG. 6B.

By the above procedure, a shaped object is formed on the surface of the thermally expandable sheet 10.

Note that the thermal conversion layer may be formed only on the front side or only on the back side. In the case of causing the thermal expansion layer 13 to expand using only the front-side conversion layer 81, steps S1 to S4 of the above processing are performed. On the other hand, in the case of causing the thermal expansion layer 13 to expand using only the back-side conversion layer 83, steps S3 to S6 of the above processing are performed.

According to the thermally expandable sheet 10 and the method of manufacturing the thermally expandable sheet 10 of the present embodiment, the cover layer 14 having an elastic property is provided on the thermal expansion layer 13. With the configuration, occurrence of cracks in the thermal expansion layer 13 when the thermal expansion layer 13 expands is suppressed, and the cracks can be concealed by the cover layer 14 when the cracks occur in the thermal expansion layer 13. Further, with the stress buffer layer 12 having an elastic property between the base material 11 and the thermal expansion layer 13, the difference in stress between the base material 11 and the thermal expansion layer 13 is reduced and occurrence of cracks in the thermal expansion layer 13 can be prevented. Note that cracks relatively often occur in the thermal expansion layer in a case of a sheet not having the configuration of the present invention, especially, in a case where the base material is made of a resin. Therefore, the configuration of the present invention is effective when the base material 11 is paper, and the configuration of the present invention exerts an excellent effect in the case of using a resin film as the base material 11.

In addition, since the stress buffer layer 12 favorably adheres to the base material 11, the stress buffer layer 12 can prevent the thermal expansion layer 13 from coming off the base material 11. Note that the thermal expansion layer is more likely to come off particularly in a case where the base material is made of a resin in a sheet not having the configuration of the present invention. Therefore, the configuration of the present invention is effective when the base material 11 is paper, and the configuration of the present invention specially exerts an excellent effect in the case of using a resin film as the base material 11.

Figure 7A:
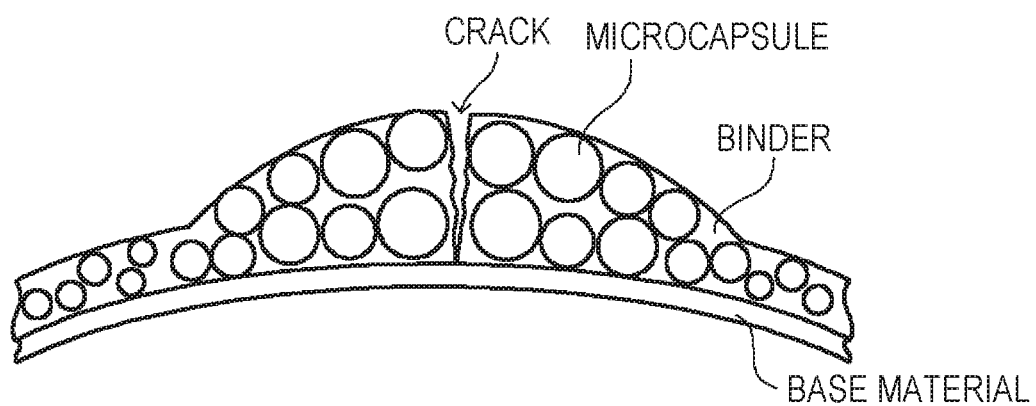
FIG. 7A is a view illustrating a comparative example including only a thermal expansion layer.

For example, as a comparative example, FIG. 7A illustrates an example in which only a thermal expansion layer, in other words, a thermally expandable sheet not including a stress buffer layer and a cover layer is caused to expand. In this configuration, cracks occur in a surface of the thermal expansion layer, as illustrated in FIG. 7A. Such cracks impair aesthetic appearance of a shaped object expressed by bulging of the thermal expansion layer. Further, if a color ink layer is formed on the cracks, a color ink cannot be uniformly placed on the cracked portion, and aesthetic appearance of the color ink layer is impaired.

Figure 7B:
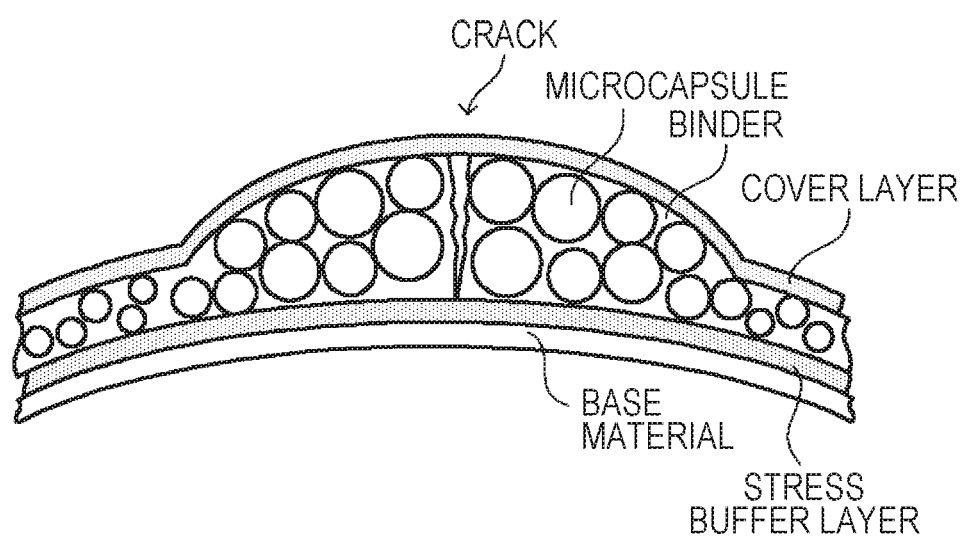
FIG. 7B is a view for explaining effects of the thermally expandable sheet according to the present embodiment.

In contrast, a thermally expandable sheet illustrated in FIG. 7B adopting a configuration similar to the present embodiment, cracks can be concealed by a cover layer even in a case where cracks occur in a surface of a thermal expansion layer by expansion of the thermally expandable sheet. Therefore, the aesthetic appearance of the shaped object expressed by the bulging of the thermal expansion layer is not impaired and can be made favorable. Further, the color ink layer can also be favorably formed on the thermal expansion layer.

The present invention is not limited to the above-described embodiments, and various modifications and applications are possible.

Figure 8A:
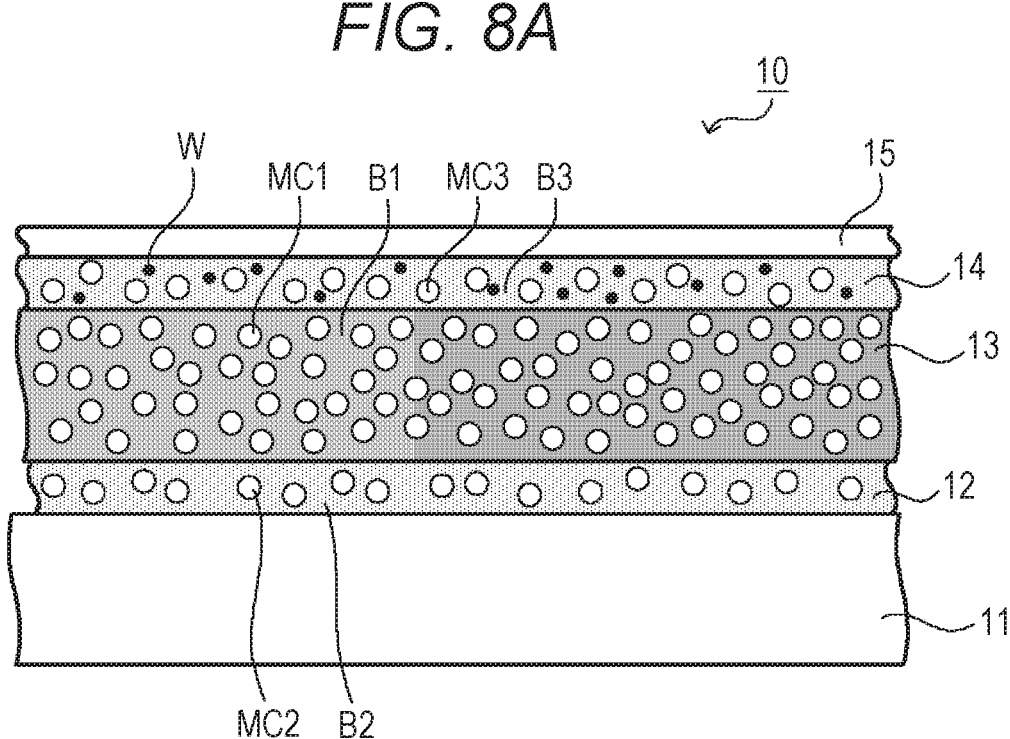
FIGS. 8A and 8B are views illustrating a thermally expandable sheet according to a modification.

For example, the thermally expandable sheet 10 may contain a white pigment W in the cover layer 14 as illustrated in FIG. 8A. As the white pigment W, any material can be used as long as the material is a pigment exhibiting white, and for example, a material selected from titanium oxide, barium sulfate, and zinc oxide can be used. As the white pigment W, titanium oxide is particularly favorable. In the present embodiment, the whiteness of the thermally expandable sheet 10 can be improved by mixing the white pigment W in the cover layer 14.

Figure 8B:
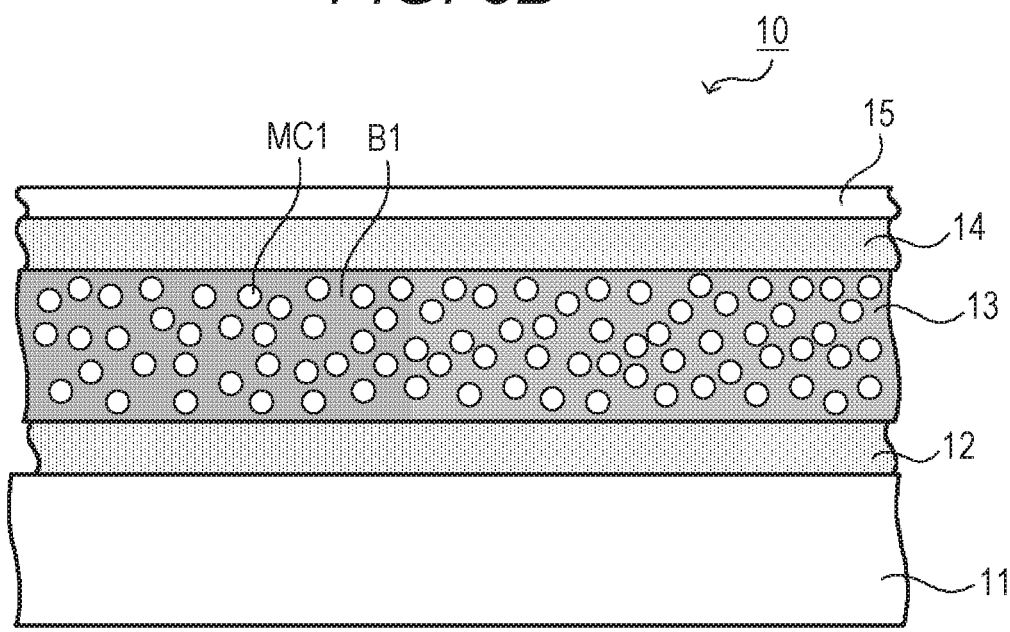

As described above, the stress buffer layer 12 of the thermally expandable sheet 10 does not need to contain the thermally expandable material MC1 as illustrated in FIG. 8B. Similarly, the cover layer 14 does not need to include the thermally expandable material MC3.

Further, the above-described embodiments can be appropriately combined. For example, a configuration in which only one of the stress buffer layer 12 and the cover layer 14 contains the thermally expandable material and the other does not contain the thermally expandable material is possible. Further, a configuration in which the cover layer 14 does not contain the thermally expandable material MC3 but contains the white pigment W is also possible.

Note that the drawings used in the embodiments are for explaining the embodiments. Accordingly, the thickness of each layer of the thermally expandable sheet is arbitrary, and it is not intended to limit construction that the thermally expandable sheet is formed at the illustrated ratio. For example, FIG. 1 illustrates that the base material 11 and the thermal expansion layer 13 have approximately the same thickness. However, the base material 11 may be made thinner than the example illustrated in FIG. 1 with the thermal expansion layer 13. The configuration in which the base material 11 is formed to be thicker than the thermal expansion layer 13 is also not excluded. The same applies to other layers such as the stress buffer layer 12 and the cover layer 14.

The favorable embodiments of the present invention have been described above. However, the present invention is not limited to the specific embodiments and includes the invention described in the claims and the equivalent scope of the invention.

What is claimed is:

1. A thermally expandable sheet comprising:
a stress buffer layer provided on one surface of a base material and having an elastic property;
a thermal expansion layer provided on the stress buffer layer and containing a first thermally expandable material that expands according to heat and a first binder; and
a cover layer provided on the thermal expansion layer and having an elastic property,
wherein:
the stress buffer layer, the thermal expansion layer, and the cover layer are stacked in this order on the base material,
the stress buffer layer contains a second binder and a second thermally expandable material,
the thermal expansion layer contains the first thermally expandable material at a first ratio to the first binder,
the stress buffer layer contains the second thermally expandable material at a second ratio to the second binder,
the second ratio is smaller than the first ratio,
the cover layer contains a third binder and a third thermally expandable material,
the cover layer contains the third thermally expandable material at a third ratio to the third binder,
the third ratio is smaller than the first ratio, and
the first ratio, the second ratio, and the third ratio are one of a weight ratio and a volume ratio.

2. The thermally expandable sheet according to claim 1, wherein the second ratio is 1/3 to 1/8 of the first ratio.

3. The thermally expandable sheet according to claim 2, wherein at least one of:
(i) the first thermally expandable material and the second thermally expandable material are made of the same material, and
(ii) the first binder and the second binder are made of the same material.

4. The thermally expandable sheet according to claim 3, wherein
the first binder and the second binder each comprise a thermoplastic elastomer, and
the first thermally expandable material and the second thermally expandable material are a thermally expandable microcapsule.

5. The thermally expandable sheet according to claim 1, wherein the third ratio is 1/3 to 1/8 of the first ratio.

6. The thermally expandable sheet according to claim 5, wherein at least one of:
(i) the first thermally expandable material and the third thermally expandable material are made of the same material, and
(ii) the first binder and the third binder are made of the same material.

7. The thermally expandable sheet according to claim 6, wherein
the first binder and the third binder each comprise a thermoplastic elastomer, and
the first thermally expandable material and the third thermally expandable material are a thermally expandable microcapsule.

8. The thermally expandable sheet according to claim 1, wherein the cover layer contains a white pigment.

* * * * *